United States Patent
Harris (10) Patent No.: US 9,579,961 B2
(45) Date of Patent: Feb. 28, 2017

(54) HYBRID VEHICLE WITH MODULAR BATTERY SYSTEM

(76) Inventor: Scott C Harris, Rancho Santa Fe, CA (US)

( * ) Notice: Subject to any disclaimer, the term of this patent is extended or adjusted under 35 U.S.C. 154(b) by 1221 days.

(21) Appl. No.: 12/025,007

(22) Filed: Feb. 2, 2008

(65) Prior Publication Data

US 2009/0078481 A1    Mar. 26, 2009

Related U.S. Application Data

(63) Continuation-in-part of application No. 11/860,537, filed on Sep. 24, 2007.

(51) Int. Cl.
| | |
|---|---|
| *B60L 1/00* | (2006.01) |
| *B60K 1/04* | (2006.01) |
| *B60K 16/00* | (2006.01) |
| *B60K 17/356* | (2006.01) |
| *B60L 8/00* | (2006.01) |
| *B60L 11/18* | (2006.01) |

(52) U.S. Cl.
CPC .............. *B60K 1/04* (2013.01); *B60K 16/00* (2013.01); *B60K 17/356* (2013.01); *B60L 8/003* (2013.01); *B60L 11/1816* (2013.01); *B60L 11/1864* (2013.01); *B60K 2016/003* (2013.01); *B60L 2200/26* (2013.01); *B60L 2270/34* (2013.01); *B60W 2510/244* (2013.01); *Y02T 10/7005* (2013.01); *Y02T 10/7061* (2013.01); *Y02T 10/7072* (2013.01); *Y02T 10/7083* (2013.01); *Y02T 10/90* (2013.01); *Y02T 90/14* (2013.01)

(58) Field of Classification Search
USPC ...................... 180/65.1–65.51; 320/116–120
See application file for complete search history.

(56) References Cited

U.S. PATENT DOCUMENTS

| | | | | |
|---|---|---|---|---|
| 5,637,980 | A | 6/1997 | Wu | |
| 6,082,476 | A * | 7/2000 | Stulbach | 180/65.25 |
| 6,232,674 | B1 * | 5/2001 | Frey et al. | 307/10.1 |
| 6,734,645 | B2 * | 5/2004 | Auerbach | 318/139 |
| 6,741,065 | B1 * | 5/2004 | Ishii et al. | 320/122 |
| 6,757,597 | B2 * | 6/2004 | Yakes et al. | 701/22 |
| 7,208,894 | B1 * | 4/2007 | Earle | 318/105 |
| 2004/0036446 | A1 * | 2/2004 | Iwashima | 320/116 |
| 2004/0134694 | A1 * | 7/2004 | Allen et al. | 180/65.1 |
| 2005/0029026 | A1 * | 2/2005 | Heinen | 180/65.5 |
| 2005/0035741 | A1 * | 2/2005 | Elder et al. | 320/116 |
| 2005/0052080 | A1 * | 3/2005 | Maslov et al. | 307/10.1 |
| 2005/0110460 | A1 * | 5/2005 | Arai et al. | 320/116 |
| 2006/0162973 | A1 * | 7/2006 | Harris et al. | 180/65.3 |
| 2006/0214636 | A1 * | 9/2006 | Arai et al. | 320/116 |
| 2006/0278449 | A1 | 12/2006 | Torre-Bueno | |

* cited by examiner

*Primary Examiner* — Erez Gurari (57) ABSTRACT

A modular hybrid vehicle uses multiple different modular battery units in a vehicle. New batteries can be added, or removed. The batteries can each be associated with a separate electric motor. Each battery individually drives a motor, allowing the characteristics of limited slip or all wheel drive. Also, the batteries can be replaced, or added to, to provide more battery power to the vehicle. There may be sensors at the battery that sense various characteristics and report those characteristics wirelessly to a central controller.

15 Claims, 4 Drawing Sheets

HYBRID VEHICLE WITH MODULAR BATTERY SYSTEM

This is a continuation in part of application Ser. No. 11/860,537 entitled "Charging Control in an Electric Vehicle", filed Sep. 27, 2007, the disclosure of which is incorporated by reference.

BACKGROUND

Many are concerned about global warming. It is widely believed that the amount of carbon dioxide entering the atmosphere is causing significant damage to the earth and its ecosystem.

While accurate numbers are difficult to obtain, it is believed that approximately one quarter of the carbon dioxide is a byproduct of mammal breathing. Another quarter is produced by internal combustion engines such as automobiles. The final half is produced by industrial processes.

Whatever the reality, it is for sure that reducing carbon dioxide emissions from automobiles will reduce, at least partially, global warming. Reduction of carbon dioxide emissions from a vehicle is difficult at best and may reduce the vehicle's efficiency.

Different suggestions for reducing the already existing levels of carbon dioxide in the air have been made. A few of these are described here.

A perhaps "obvious" way to reduce carbon dioxide emissions is to use plants and trees—to make sure that there are enough plants planted to photosynthesize carbon dioxide back into oxygen. Unfortunately, most studies show that there is not enough free area on the earth to plant enough plants to reverse the CO2 effect. Moreover, the planted area on the earth is reducing, not increasing, as developing nations tear down forests to make way for civilization.

Certain plants, notably bamboo, has a much higher carbon dioxide scrubbing capability than others-bamboo is believed to have triple the CO2 scrubbing capability of other plants. More planted bamboo could reduce the carbon dioxide level. It is unlikely that enough open area on the earth exists (and will remain open) to bring carbon dioxide under control using only plants.

So, how do we reverse the effects?

Suggestions have included carbon dioxide sequestration, where the carbon dioxide from the atmosphere is concentrated, and maintained in some isolated locations such as underground. Some have suggested pumping carbon dioxide into the wells that produce oil, or otherwise underground. People have suggested replacing coal powered utilities with nuclear power to avoid carbon dioxide production. Other carbon landfills have also been suggested. It has been suggested to boost the carbon dioxide out into space or orbit. Suggestions have been made to generate power in space from solar power. A solar sunshade has also been suggested, which would reduce the amount of sunlight on the earth.

Hybrid and/or electric vehicles can reduce the amount of fuel consumption. Solar charging of an electric vehicle uses no fuel and causes no carbon dioxide production. However, many have claimed that solar charging for an electric vehicle is impractical.

The use of hybrid vehicles and/or electric vehicles can reduce energy consumption. These vehicles are referred to herein as being "electric" vehicles. These vehicles obtain at least some of their energy from electricity.

Electric vehicles can be used to regenerate energy from otherwise-wasted vehicle momentum, and then later recycled to drive the vehicle.

A purely electric vehicle may use electrical mains charging to charge the batteries, and to use that charge to drive the vehicle. Electric power from the mains can be more efficiently produced, and more aggressive waste gas reduction techniques can be used in such stations. Moreover, there is much more flexibility in the kinds of fuel that can be used to create electricity, e.g., nuclear, coal or other fuels.

Current electric vehicles are limited in the amount of batteries they can hold, and hence in the amount of energy they can save.

SUMMARY

The present application describes aspects including a first aspect that facilitates charging batteries within an electric-driven vehicle, such as an electric vehicle or hybrid vehicle.

Another aspect describes using the otherwise-unused surface areas on a vehicle to capture solar energy in a way that stores energy for use in driving the vehicle at a later time.

Another aspect explains how electric vehicle batteries can be charged in a more economical way.

Another aspect describes using the solar cells only when the vehicle is not in use.

An aspect describes placing solar cells on movable platforms that cover areas where a user could not have solar cells during driving: such as in the front windshield or rear mirror.

Another aspect describes a simplified way of charging batteries in an electric-driven vehicle.

The present application describes a modular approach to electric vehicles. This modular approach produces unexpected advantages described in this application. A modular approach to battery configuration is described. This allows individual powering of different wheels, by putting individual batteries near individual driving wheels.

A fault correcting system for the batteries is also described that is facilitated by the special architecture.

BRIEF DESCRIPTION OF THE DRAWINGS

These and other aspects will now be described in detail with reference to the accompanying drawings wherein.

DETAILED DESCRIPTION

Studies have suggested that there is likely not enough area to plant enough plants to scrub enough CO2 out of the atmosphere to solve the global warming problem. The undersigned recognizes, however, that one area that is largely unused is certain surfaces of an automobile, especially the areas of the windshield and back window when parked. The roof, windshield, and other parts of the automobile soak up large amounts of energy from the sun, which is completely wasted. In fact, this is undesirable, and many people use sun blocking shades in their windshield to reduce the amount of energy absorbed by the vehicle.

Each automobile has an internal combustion engine and produces some carbon dioxide output. While various techniques have been used to try and scrub the output gases from the automobile, these techniques each have their own host of disadvantages. Some of these techniques may make the operation of the internal combustion engine process less efficient.

The present application therefore considers an alternative paradigm. Instead of producing energy that is used for the automobile while the automobile is operational and moving, or trying to scrub the output from the automobile while it is running, one aspect uses surfaces of the automobile during times when the automobile is not otherwise in use. Most automobiles are used for between one to two hours per day, and the rest of the time left parked. During the time that the car is parked, its surface area is used to capture solar rays, and those solar rays are used in a way that may prevent or reduce carbon dioxide pollution. The surface area may be used to power the automobile itself, or may use some kind of carbon dioxide scrubbing.

Solar automobiles have been suggested. However, most suggestions of solar cells suggested that solar technology is not sufficient to assist with vehicle operations. Techniques to allow solar cells to become practical are also disclosed.

Figure 1:
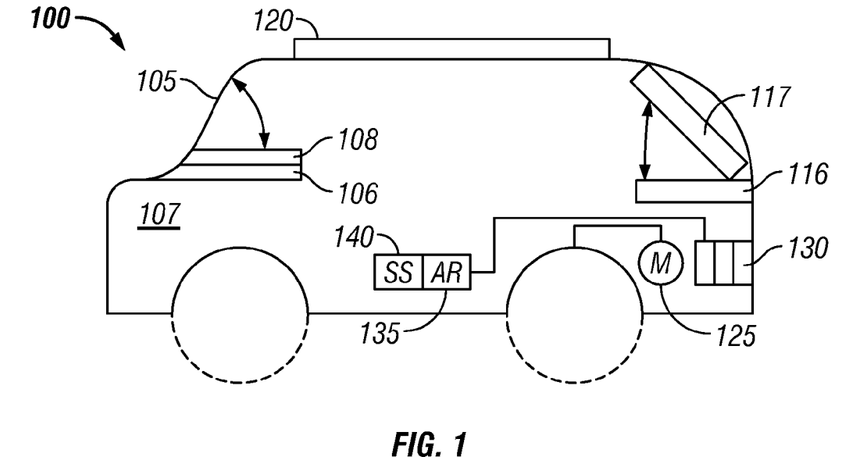
FIG. 1 shows a solar power embodiment.

An embodiment is shown in FIG. 1. In the FIG. 1 embodiment, the automobile 100 includes a windshield 105, a roof 110, and a rear window 115. Both the front window and the rear window have associated solar cells. The solar cell 106 for the front window is movable between its stowed position 107, and an active position where it blocks the entire windshield 105. When moved into this active position, the solar cell in effect is put into the position of a sun screen. Often people put up sun screens when they park their cars because parking in the sun overheats the car. An embodiment places a solar cell in place of the sunscreen, to accept solar energy. The solar cell is preferably a flexible solar cell which can be somewhat deformed when placed into its stowed position. In one embodiment, the solar cell normally rests on the dashboard, and a covering 108 may also extend over the dashboard. As explained herein, when the car is parked and sun is detected, a controller operates linear motors to remove the covering 108, and extend the solar cell 106 to a position completely covering the windshield. In a similar way, the solar cell 116 is extendable into the position shown at 117 to cover the rear window. Another solar cell, such as 120 may be on the roof. In one embodiment, the solar cell may be mountable in a sunroof, to prevent theft or otherwise.

The vehicle 100 is an electrically-operable vehicle that takes some or all of its electric power from stored battery charge. Vehicle 100 may be an electric vehicle or a hybrid vehicle. The vehicle may include an electric motor 125 driven by a battery pack 130.

The battery pack 130 is formed of a number of connected battery cells, e.g., at least 3 battery cells, each having positive and negative battery terminals. In an embodiment, the batteries (via their battery terminals) are connected in two different ways depending on whether the automobile is operating or non-operating and charging. During operation, the batteries are connected in series to output a high voltage output to drive the motor 125. For example, the battery output may be 250 volts in a conventional hybrid vehicle. The 250V output may be inverted and increased to an even higher voltage such as 500 V, to drive the motor 125.

The high voltage output of the battery cells has been an impediment to charging these batteries. The charging has typically required an output voltage of 90-250 V DC to charge the batteries. An embodiment described herein describes re-connecting the battery bank during 'offline' charging operation, that is during the time when the batteries are being charged but the vehicle is not operating.

A reconnection mechanism 135 allows rearranging the batteries from their series configuration, where the series connection produces 250 V, to a parallel configuration where all the battery cells are connected in parallel to produce 12 V, and can be charged by a single 12 volt charger. The reconnection mechanism can be, for example, a high-voltage/high current contactor style relay, which are conventionally available.

A soft start circuit 140, may be used as part of the reconfiguration to reduce the amount of transient current flows.

Figure 2A:
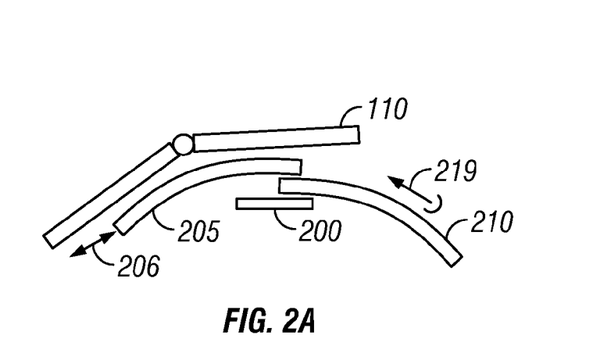
FIGS. 2A-2B show movement of solar cells.

The embodiment in FIG. 1 shows the solar cells such as 106 being extendable up into the windshield. However, flexible solar cells may also be extendable downward. The roof 110, for example, may have a hollow portion shown as 200 in FIG. 2A. That includes flexible or curved solar cells therein, for example, flexible solar cells available from Silicon Solar Inc. The solar cell 205 may be movable in the direction of the arrow 206 to cover the windshield. The solar cell 210 may be movable into position 211 to cover the rear window. Both of these solar cells may normally be stored within the roof of the vehicle and extended only when the vehicle is parked, and sun is detected.

Figure 2B:
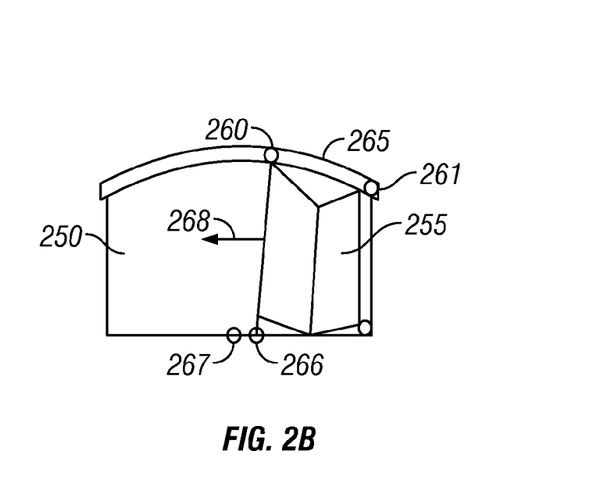

FIG. 2B illustrates an unfolding or unfurling solar cell 255. As shown in FIG. 2B, the solar cell 255 may unfold in accordion style, much like a conventional accordion style folding sunscreen device. In the embodiment, however, the alternate edges of the solar panel 260, 261, may be held within a rail 265. Similarly, the bottom edges such as 266 may be analogously held. A motor such as 267, may move the overall device to open it in the direction of the arrow 268 or close it in the opposite direction. When closed, in the accordion embodiment, the solar cell sits flush against a portion of the windshield. In another embodiment, the solar cell may uncoil like a scroll, so that one part of this scroll sits against the windshield when coiled, but when uncoiled extends across the windshield. Again, the scrolling embodiment may travel on rails at the top and/or bottom. The scroll may also be spring mounted, so that the motor pulls the solar cell into place, but removing power from the motor allows the solar cell to return to its stowed position.

Figure 3:
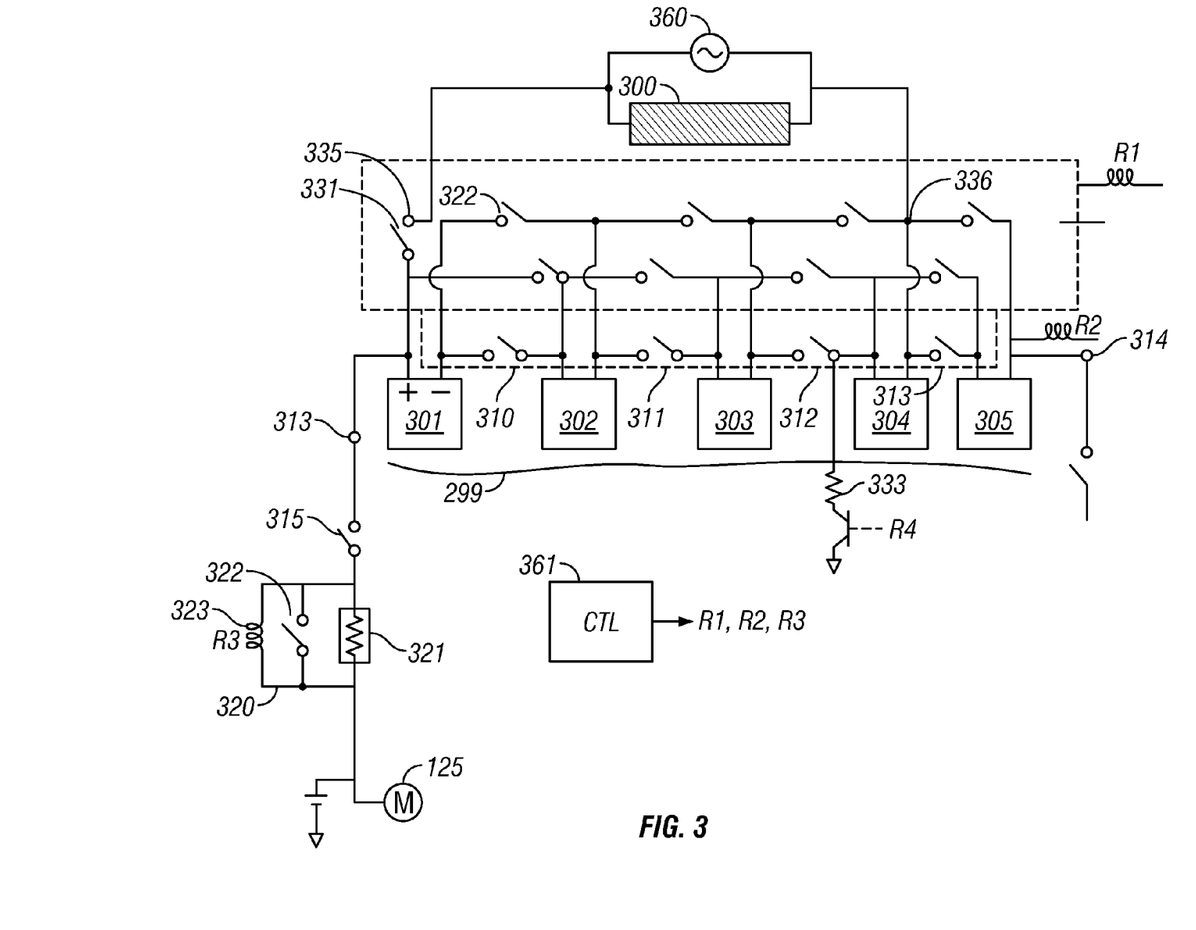
FIG. 3 shows a charging reconfiguration system.

FIG. 3 illustrates the reconfiguration system of an embodiment.

Many have suggested that present solar cell technology is not sufficient to assist with charging of hybrid vehicles. A solar cell has a theoretical efficiency of 24%, and real solar cells may have efficiencies between 10-20%. Solar cells can easily produce wattage outputs sufficient to assist in charging a battery in a solar cell. It is believed that the reason for the conclusion of insufficiency of a solar cell, was that it is difficult to obtain the necessary charging voltage, for example 250 V, from a solar cell. This is based on a basic misunderstanding of the way that these high voltage cells should be charged.

As of the writing of this document, hybrid vehicles have batteries which store between 1 kWh and 1½ kWh. The Toyota Previa, for example, stores about 1½ kilowatt hours in its battery bank.

A current, state of the art, hardened solar cell (e.g. a marine solar cell for use on a boat), produces 100 watts of output. Even assuming only 5 hours of illumination per day means that this will produce 0.5 KWH each day. A 200 watt or larger cell can be used to increase the charging capability. Parking in the sun also allows (especially in many climates) an expected charging time of more like 8 hours.

A vehicle that, therefore, is parked in the sun all day, could produce 800 W hours with a 100 watt solar cell—almost the entire charging capacity of the battery. In other words, the battery could be almost fully charged by the sun during this time—if the voltage issue could be handled.

Another aspect of this invention describes two different battery packs—a first conventional battery pack that is charged from regenerative charging in the vehicle, and a second battery pack, charged via external charging, e.g., solar or plug in. The two battery arrays are placed in parallel, during operation of the vehicle, so that either can power the electric powered systems.

Alternately, a single battery array can be used. This battery array can be charged by the external charge source as described herein.

FIG. 3 illustrates the embodiment. An external charge source may be a plug in charger, or a solar cell, which may be an array of solar cells such as shown in FIG. 1 or 2. The external charge source is shown generically as 300. The charge source 300 is arranged to produce a 12 V output. In the embodiment, the batteries in the battery array are reconfigured between two voltages. A high voltage arrangement where the batteries are connected in series to get a high voltage to drive the motors in an electric or hybrid vehicle. A lower voltage arrangement places the batteries all in series, to allow them to be charged by a 12 volt charger.

FIG. 3 shows the battery bank 299 including five batteries, 301, 302, 303, 304 and 305. While only five batteries are shown for simplicity, it should be understood that a hybrid vehicle or electric vehicle may have many more batteries, e.g., 20 to 25 batteries. The connection shown in FIG. 3 is the same for 5 batteries, or any number of batteries, e.g. 20-25 batteries.

Relays R1 and R2 rearrange the connection of the batteries between series and parallel. The relays are connected to terminals of the batteries. Both relays are normally open relays, so that the default is that the contacts fail open. Alternatively, a single relay with sufficient number of contacts can be used.

This embodiment uses two separate battery banks, the reconfigurable bank 299, and the conventional regenerative bank 350. Regenerative bank 350 may operate off regenerative means such as conventional means in a vehicle.

The relay R2 has its contacts connected in series between terminals of the batteries of the bank 299. When the relay R2 is energized, its corresponding contacts 310, 311, 312, 313, 314 are closed. This closure connects the the batteries of the bank 299 into a series connection between the first positive node 313, and the last negative node 314. If 20 batteries are connected in series, the resulting voltage between the nodes 313, 314 is approximately 250 V.

Another relay contact 315 may be part of relay R2, or may be a separate relay. This contact is also closed to connect the series connected battery bank in parallel with the regenerative battery 350 if present, and to the electric motor 125.

In the embodiment, the voltage output of the bank 299 may be charged to a different voltage then that of the regenerative battery 350, since the banks 299 and 350 are being charged using different means. This voltage level may cause high current flow between the batteries until voltage equalization occurs. A current limit/soft start circuit 320 may be connected at first to limit the current surges.

Soft start circuit 320 includes a resistance 321, for example 50 ohms, with a relay contact 322 connected across the resistance. When the battery is first connected, current flow is through the resistance. The resistance limits the current flow. After a few seconds, the voltage may equalize. Auxiliary contact 322 is then closed to reduce the series resistance to near zero. Auxiliary contact 322 may be controlled by a controller, or may be simply closed when the relay coil 323 gets to a specified voltage point indicating that the voltages have stabilized. During charging mode, the relay contacts of R2 are are opened to remove the series connection.

Relay R1 has its contacts connected to place all the battery cells within the bank 299 in parallel with one another. In the connection shown, R1 has twice as many contacts as R2, shown as 331, 332, . . . . The relay contacts 331, 332 . . . place each of the batteries 301, 302, 303 . . . into a parallel connection with one another. In this parallel connection, the voltage (e.g., 12 v) appears between nodes 335 and 336. In another embodiment, there may be additional circuitry to reduce voltage transients during switching between series and parallel.

A charging system, here either or both of solar cell 300 and/or plug in charger 360, is connected to all of the batteries 301, 302, 303, 304 . . . in parallel.

A 12 V output from the charging system, e.g. the solar cell 300, charges each of the batteries in parallel. That 12 V charging voltage is removed during operation of the motor 125.

The plug-in charger, 360, for example, may be a relatively inexpensive 12 V charger. For example, even a charger that produces 200 W will fully charge the battery overnight. Moreover, since 12 V charging systems are relatively cheap, and the technology is well established, this facilitates the technology of a plug-in charger.

When the plug-in charger 360 is used, for example, both banks of batteries could be charged by that charger. Moreover in an alternative embodiment, there is only one bank of batteries that is charged by solar/plug in when idle, or by regenerative means when the vehicle is operating.

Figure 4:
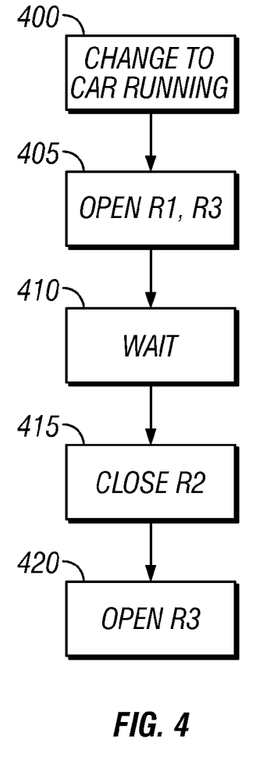
FIGS. 4 and 5 show a charging flowchart.

The operation follows the flowchart of FIG. 4, which is controlled by the controller 361 in the vehicle.

At 400, the controller sensors a change to a condition where the automobile is running. When the automobile starts running, the system opens R1 and R3. By opening R1, the battery bank is taken out of its parallel connection, and since relay two is already open, all contacts are floating. 410 represents a waiting period which should be one to two seconds, which allows the voltages on the battery terminals to equalize slightly e.g. through the internal resistance of the batteries.

Since the batteries were in series, the highest voltage on those batteries should be 12 V, so the waiting at 410 can be a relatively short period.

At 415, relay R2 is closed, placing the batteries into series with one another. This produces a high voltage output at node 313. After a specified time, allowing the voltages at 313 to equalize with the voltage of the regenerative battery 350, the relay R3 is opened.

The vehicle can then operate normally.

Figure 5:
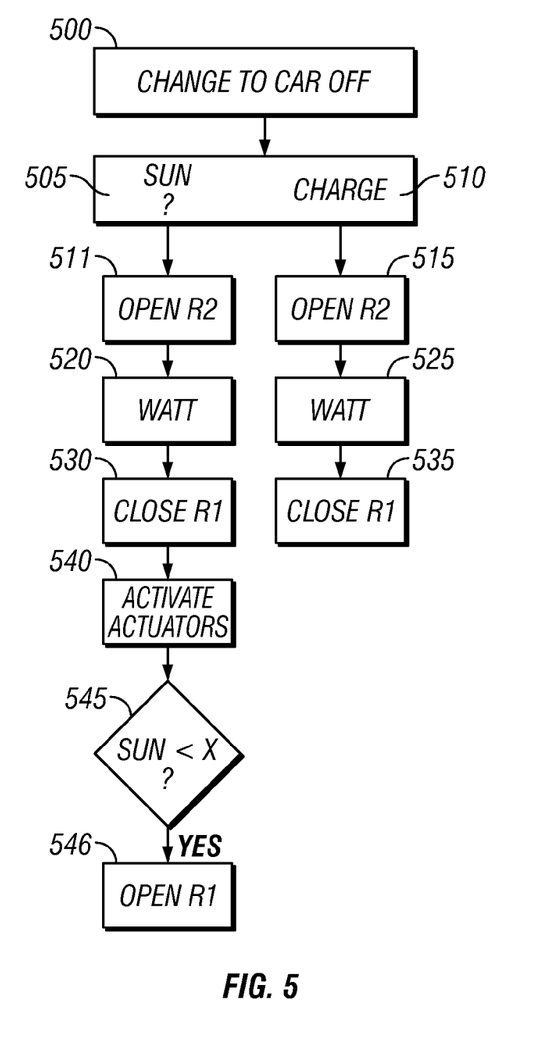

FIG. 5 represents the flowchart, which is executed when there is a change to the car being off at 500. 505 represents the detection of whether there is sun. This may use a fixed solar cell, and a test of the output voltage of that solar cell to determine whether the sun is over a specified in now. If there is no sun, no operation may be carried out at this point. Alternatively, a charging operation with a plug-in charger at 510 can be detected. Either charging operation has the same effect.

In both sun (511) and plug in charge (515), R2 is opened.

Note that in the case of R2 being opened, some of the batteries will have relatively high voltages on their terminals. For example, the battery terminal on 304, if it is the 21st battery, may have 180 V between its + terminal and ground, even though there is only 12 v across its terminals. This is only a potential, which should quickly dissipate through the internal resistance of the battery. As an alternative, a very high resistance, such as 100 K. to 1M ohm, shown as resistance 333 may be quickly grounded through a switch 334. The switch can be an electronic switch, e.g., a FET, since the amount of current will be negligible.

The waiting period at 520/525 again allows these voltages to equalize. During this waiting period, the switches such as the FET 334 may be activated.

After the waiting period, at 530 535, the relay R1 is closed, all of the batteries in the bank 299 are connected into parallel, enabling them to be charged by a single global charger.

This completes the charging connection, but an additional step of 540 is carried out in the solar operation of activating the actuators to allow the solar devices to cover the windshield and/or roof and/or back window and/or other surfaces.

At 545, a sun<x routine is run, in which when the sun goes lower than a specified amount, the relay R1 may be opened at 546 in order to save energy.

Another embodiment recognizes that electric vehicles become more efficient when more battery power. More battery power, for example, allows the vehicles to run for a longer time and distance on a charge.

However, in any vehicle, the amount of room that can be used to store items is inherently limited. Current electric vehicles often group the batteries in a single space below the trunk.

The inventor recognizes that this current locations and configuration of batteries in an electric vehicle produces a number of problems. One problem caused by this packaging is that, when the batteries are being charged, the charging produces heat. Keeping all the batteries together all in one place causes all that heat to be produced in the same place. This can produce dangerously hot temperatures in the area of the battery storage.

The space in the trunk is also inherently limited by the size of the car, and this inherently limits the space available for batteries, and hence limits the number of batteries that can be used in a vehicle.

Then inventor recognizes also the power from these batteries really does not need to be delivered near the trunk. Rather, this power is typically used by electric motors located near the drive train. The inventor recognizes, therefore, at least the following disadvantages of putting all the batteries in one place in the vehicle. When all the batteries are all together, charging (and also drawing power) produces concentrated heat in one location. When the batteries are located near the trunk, or in any other single place, the power is routed to other locations near the wheels, etc. Moreover, putting all the batteries in any one location inherently limits the amount of space that can be devoted to batteries.

Figure 6:
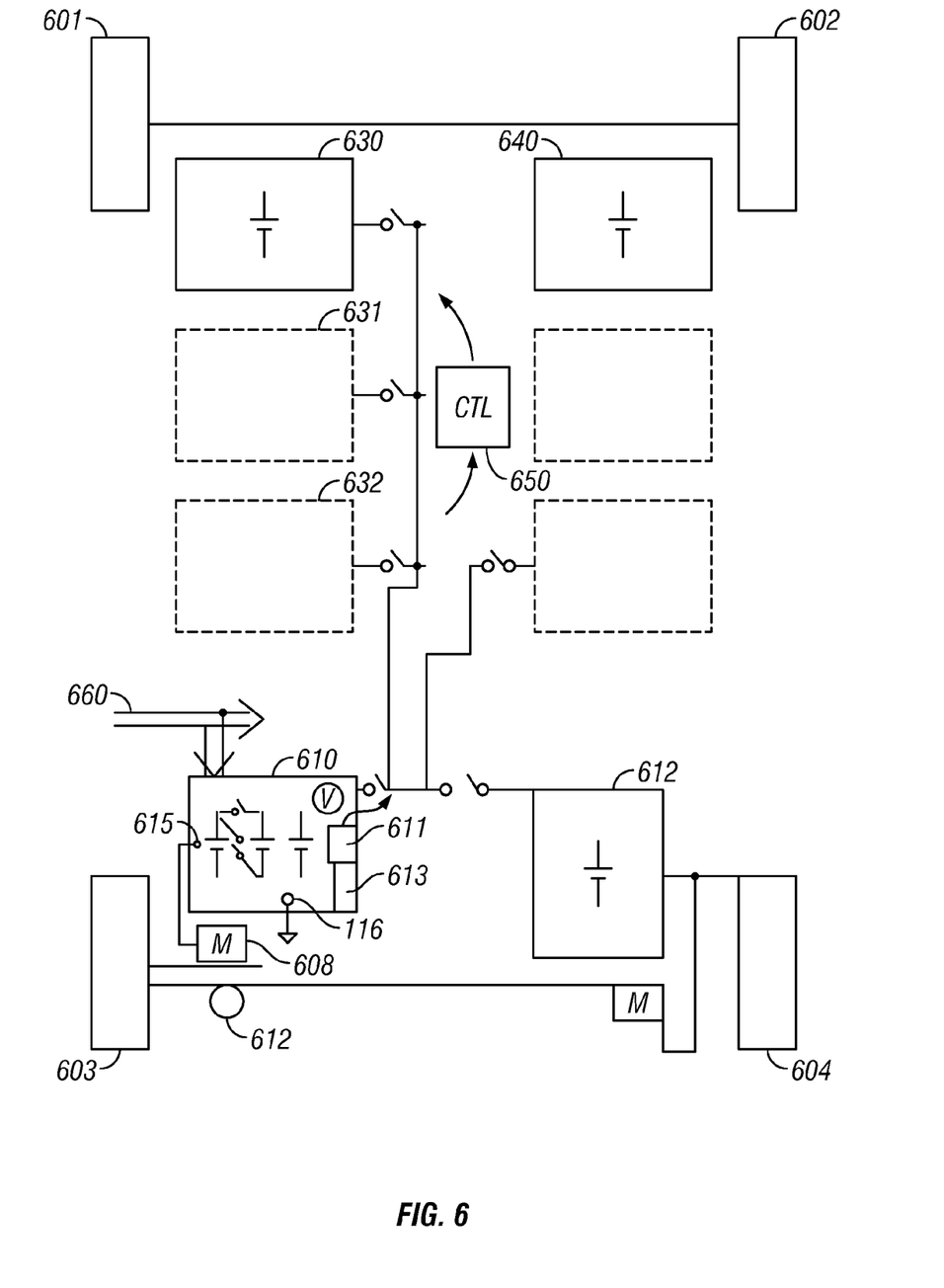
FIG. 6 illustrates a diagram of a vehicle with a modular battery set and control system.

FIG. 6 shows an embodiment which describes a modular approach. 600 illustrates a vehicle with a number of wheels 601, 602, 603, 604. Each wheel is connected to an axle as conventional, for example wheels 603, 604 are connected between axle 605. In addition, an electric motor 606 driven is located adjacent the wheel 603. The electric motor 606 is driven by a battery. A battery module 610 is located in the area of the wheel 603. The motors can be located anywhere near the drive train, and need not be adjacent the wheels. The battery pack should be near a motor.

The battery module 110 may include a number of battery cells in series. In addition, the battery module may include a number of relays which allow the batteries to be connected into a parallel configuration for charging, as described in previous embodiments.

The battery module 610 has one terminal connected to vehicle ground, and the other connection, e.g., its positive connection, is selectively connected to the motor 606.

A control module 611 may be a wireless module that is controlled by other systems in the vehicle as described herein, including the central controller 650.

A number of monitors are also used to determine characteristics of the battery packs and the driving of the motors. Preferably, separate monitors are provided in each module, to individually determine characteristics of each module. Monitors may include a torque monitor 612, a temperature monitor 613 and a voltage monitor, for example.

The module may include connectors that allow it to be connected into place, for example to the connector points shown as 615, 616.

Another module 620 is located near the wheel 604. Other modules may also be located at the other spots throughout the vehicle. This vehicle, for example, may come equipped with two modules, shown as 610, 620. It may optionally have two additional modules 630, 640. One module is located near each wheel, and drives a motor that drives the wheel. In this way, the electric motors each individually drive a wheel, making the vehicle a true all wheel drive vehicle that has each wheel driven by a motor. Other modules and/or module connection locations can also be located throughout the vehicle, each for example in different locations. Adding more batteries adds more capability to the electric vehicle. In addition, space is less limited, since the batteries can be distributed to different locations. Heat caused during charging is more spread, and less likely to cause a dangerous situation.

Each module is also selectively connectable to the other modules, e.g., by a relay connection. The relays can be closed to connect the voltages of any two modules in series. In an embodiment, each module, when connected in its normal (operating) configuration, may have for example a nominal output voltage of 90 V. However, during operation of the vehicle, some of the modules may be drained more than others of the modules. This may happen when some modules are used more aggressively than other modules, or some modules may have weaker batteries with less charge capacity, or because of problems within the battery module, or other issues.

One of the sensors within the modules may include a voltage sensor 116. The module wirelessly reports its voltage, along with other parameters, to the vehicle controller 650. Each of the modules analogously sends the information to the controller. The controller 650 thus wirelessly receives status/fault and other information from each of the modules. The wireless receiver monitors the voltages from each of the installed modules. When any module has too much difference from the other modules, a relay is energized to close a connection that connects that lower voltage module into a circuit with other modules. This equalizes the voltages between the modules, in essence, increasing the voltage of the lower voltage module.

In addition, the modules are themselves formed of multiple series connected battery cells. The modules can determine faults and otherwise monitor problems within the individual battery cells. For example, if one of the battery cells in the module has malfunctioned, this may be detected by the controller. A malfunctioning battery cell can be removed from the circuit by an automated switching configuration. At the same time, this system reports back problems with the battery cells, to monitor repair of the cells.

In the modular configuration, the battery can be easily repaired by replacing the entire module with another module. The malfunctioning module can be replaced by a new one. The old one can be rebuilt, for example, to include new battery cells, or just to replace the malfunctioning cell.

In an embodiment, each of the wheels has its own source of power, and an individual motor. A torque meter can be used in accordance with the vehicle control to determine how much to energize each of the individual motors. As the vehicle goes around a curve, or as some wheels gain or lose traction, the torque on each wheel also changes. The torque is measured and used to determine how much drive to apply to each wheel. For example, the torque determination can be used to limit the amount of allowable slip between wheels. Other analogous determinations of wheel movement can be used to limit the slip and/or determine how to drive the wheel movements.

The torque determination allows determination of how much the wheels should be driven by the individual electric motors. In essence, this becomes an all wheel drive vehicle, with each wheel individually driven by an individual motor.

In an embodiment, the individual motors are each controlled by wireless sensing of parameters at the wheels by the central controller.

In the embodiment, moreover, additional modules can be added. For example, areas 631, 632 can be additional areas within the vehicle where additional modules can be placed. More modules can be added to increase the number of batteries driving the vehicles. These modules can be charged and discharged either by electrical connection, or regeneratively. Moreover, these modules can be switched in and out of the circuit, as desired or necessary.

For example, if the module is in location 631, it can be switched into position in place of module 630, or in parallel to module 630. If the voltage module 630, for example, is lowered too much, module 631 can be switched in to the circuit. Any of the modules can also be switched into a series combination. Embodiments may provide, therefore, switching to allow an additional module to be switched in place of another module, in series with or in parallel with any of the existing modules. The controller 650 controls the relays, and hence controls how this switching occurs.

This makes available a new paradigm which has never before been possible. Vehicles can be sold for example with two or four battery modules. Each of the modules may be 80 V, and hence may include 54 small battery cells. These battery cells can each be connected in groups. Each group is connected by relays to another group. For example, each group of battery cells may be a 12 V group of battery cells (e.g., 8 or 9, 1.5 volt cells, in series).

Cells are connected in series to increase the overall voltage. However, like series-connected Christmas lights, failure of even a single cell could open circuit the whole group. Therefore, if any cell malfunctions, either that one cell, or a subgroup of those cells, is bypassed by a switching connection carried out by the relay. This bypasses the faulty cell, allowing the battery to still operate, albeit at a lower voltage. For example, this can be done by first sensing a cell group that has faulted, and is open circuit, for example, it is outputting zero volts. Once detecting that failed cell group, each of the connectable areas on that cell are connected to, one by one, and each cell area is tested to see if it produces a voltage output. If it produces no voltage output, then that cell part is assumed to be the faulted part, and is removed from the circuit, e.g., by short circuiting the part. Other ways of detecting faulted cells can also be followed. When a faulted cell or cell group is removed from the circuit, the voltage of that group is lowered. However, other cells may be connected with that cell, to increase that voltage.

Adding an additional module allows the module to be automatically recognized by the controller (using standard techniques) and added to the power management scheme. For example, on startup, the controller may initially poll all modules and that poll may request all modules to respond. The controller stores a list of the different modules and their locations. After making this list, the controller then decides how optimally to drive the vehicle, based on wheel loading (e.g., torque) and voltages of the modules. If any module has too low a voltage, the controller determines if another module can be switched in either in place of or in series with another module. If necessary, all the modules may be connected together to equalize the voltage between all the modules.

The modules may also be connected in parallel during charging, so that a single charge connection shown as 160 can charge all the 12 volt groups of all the modules in parallel as in the previous embodiments. The charging connection can be a 12 V connection to the modules in a series configuration. This allows charging the modules connected in parallel. When the modules are used, they can be reconnected into series, to create an increased voltage.

While the above has described wireless control by the central controller, there can also be control via wires connected to each of the modules, so that they can communicate over the control wires.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other case sizes and shapes are intended to be encompassed. Other kinds of batteries are contemplated. Other vehicles beside automobiles may be controlled in this way.

The terms "cells" and "cell groups" are used herein to represent one or many battery cells. Also, the inventor intends that only those claims which use the words "means for" are intended to be interpreted under 35 USC 112, sixth paragraph. Moreover, no limitations from the specification are intended to be read into any claims, unless those limitations are expressly included in the claims. The communicator described herein may include any kind of computer, either general purpose, or some specific purpose computer such as a workstation. The computer may be an Intel (e.g., Pentium or Core 2 duo) or AMD based computer, running Windows XP or Linux, or may be a Macintosh computer.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. An electrically-operable vehicle, that comprises plural separate battery modules, including a first battery module at a first location in the vehicle, and a second battery module at a second location in the vehicle, and wherein each of said first and second battery modules are operative to produce drive for the vehicle, and a plurality of switches, and a controller for said plurality of switches, said plurality of switches being controlled by said controller for switching said modules into a parallel connection at a first time based on a condition of said battery modules, a serial connection at a second time based on said condition of said battery modules, and a configuration at a third time where one of said battery module replaces another of said battery modules based on said condition of said battery modules.

2. A vehicle as in claim 1, wherein said first battery module is adjacent a first wheel of a vehicle, and said second battery module is adjacent a second wheel of the vehicle, and further comprising a third battery module located at a third location adjacent a third wheel of the vehicle.

3. A vehicle as in claim 1, wherein said battery modules each include at least one sensor therein, that produces information indicative of a condition of said battery module; and
a controller, receiving said information from said sensors indicating how much energy each said battery module has relative to other battery modules and providing extra power to a battery that has less energy.

4. A vehicle as in claim 3, wherein said sensors communicate information wirelessly.

5. A vehicle as in claim 4, wherein said controller receives information wirelessly from a plurality of said modules.

6. A method comprising:
first using a first battery to provide power for locomotion of a vehicle;
providing a connector for a second battery; and
attaching a second battery to said connector and automatically operating using both said first battery and said second battery to provide power for locomotion of said vehicle, responsive to said second battery being attached;
wherein said first using operates using said first battery but not said second battery to provide power for locomotion of said vehicle when said first battery is connected to said vehicle and said second battery is not connected to said vehicle; and
when said first battery and said second battery are both connected to the vehicle, controlling based on conditions of said first and second battery to use said first and second batteries in parallel to one another at a first time for locomotion of said vehicle and in series to one another at a second time for locomotion of said vehicle and with only one of said first and second batteries connected to the vehicle at a third time for said locomotion and with the other of said first and second batteries being connected to the vehicle at a fourth time for said locomotion in place of said only one of said batteries.

7. A method as in claim 6, wherein said first battery and said second battery are in different locations in the vehicle.

8. A method as in claim 6, further comprising automatically adjusting a connection of said first battery and said second battery based on sensed characteristics.

9. A method as in claim 6, further comprising wirelessly detecting characteristics of said batteries.

10. A method as in claim 6, wherein at least one of said batteries comprises a plurality of series connected parts, and further comprising detecting a malfunctioning series connected-part, and producing a connection that avoids said malfunctioning series connected-part.

11. A vehicle comprising
a first electric motor, driving a first wheel of the vehicle;
a first battery, associated with said first electric motor, and selectively energized to drive said first electric motor;
a second electric motor, driving a second wheel of the vehicle;
a second battery, associated with said second electric motor, and selectively energized to drive said second electric motor; and
a controller, that separately controls said first battery driving said first electric motor, and said second battery driving said second electric motor, and where said controller detects a different in voltage between said first and second batteries, and automatically equalizes said voltage.

12. A vehicle as in claim 11, wherein said controller automatically equalizes said voltages by connecting said first and second batteries into parallel with one another, and where another connection connects said first and second batteries directly to said motors without connecting said first and second batteries in parallel with one another.

13. A vehicle as in claim 11, wherein said controller receives information used for driving said first and second motors wirelessly.

14. A vehicle as in claim 11, wherein said vehicle is operable in a first mode with said first and second batteries without a third battery, and in a second mode with a third battery in addition to said first and second batteries, wherein said vehicle operates properly both with said third battery and without said third battery.

15. A vehicle as in claim 11, further comprising detecting a fault in one of said batteries, and automatically making a connection that avoids said fault.

* * * * *